2 Sheets—Sheet 1.

G. W. PARRISH.
BELT TIGHTENING DEVICE.

No. 179,487. Patented July 4, 1876.

Witnesses:

Inventor:

2 Sheets—Sheet 2.

G. W. PARRISH.
BELT TIGHTENING DEVICE.

No. 179,487. Patented July 4, 1876.

Witnesses:

Inventor:
Geo. W. Parrish
per
R. B. Moorman
Attorney

UNITED STATES PATENT OFFICE.

GEORGE W. PARRISH, OF SALEM, ASSIGNOR OF ONE-HALF HIS RIGHT TO ROBERT B. MOORMAN, OF BIG LICK, VIRGINIA.

IMPROVEMENT IN BELT-TIGHTENING DEVICES.

Specification forming part of Letters Patent No. 179,487, dated July 4, 1876; application filed March 2, 1876.

*To all whom it may concern:*

Be it known that I, GEORGE W. PARRISH, of Salem, in the county of Roanoke and State of Virginia, have invented a new and useful Improvement in Buckles for Tightening Bands and Belts, which improvement is fully set forth in the following specification, reference being had to the accompanying drawings.

Figure 1:
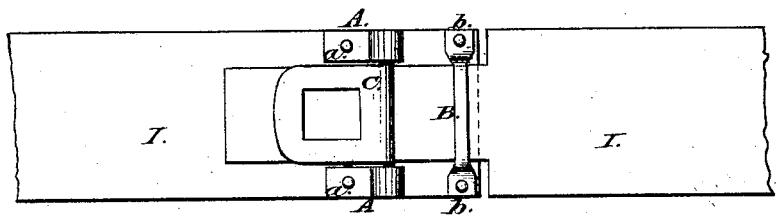

Figure 1 represents my invention as attached to a belt or band.

I represents the belt or band; A, the jaws, which are shown more in detail by Fig. 3; B, the brace supporting band I, and riveted to it at b b; C, the detaining-flap, which is made with teeth, varying in number, according to the width of the belt or band used, and which is inserted in the jaws at A A, the jaws being riveted to the belt or band at a a.

Figure 2:
Figure 3:
Figure 4:
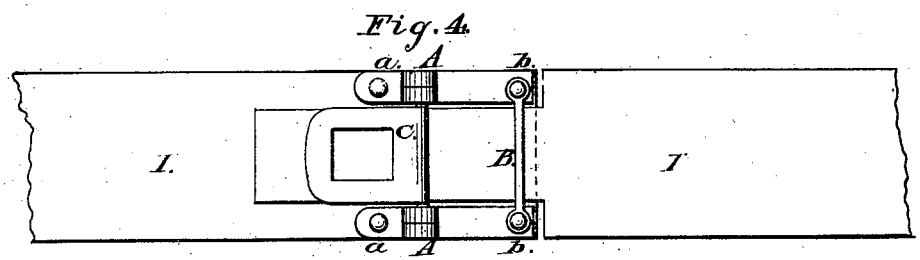
Figure 5:
Figure 6:
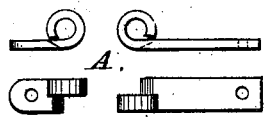

When large belts or bands are to be used, the detaining-flap C should pass through double jaws, as represented in Figs. 4, 5, and 6. When small belts or bands are desirable, a single jaw, as represented in Figs. 1, 2, and 3, is preferable. The detaining-flap working on the outside surface of the band—no metal or other friction-causing material being used on the under side, save the rivets, which should be countersunk to a level with the belt or band used, and that, when desired, my attachment permitting of being used upon all belts or bands, because made of the exact width of the band used, thus doing away with the necessity of cutting and resewing bands as they stretch, which has heretofore been a grave objection to the use of bands in machinery—combine to make it a valuable improvement.

I claim as my invention—

The belt-tightening device, composed of the skeleton-frame and the brace riveted to the band, and the detaining-flap connected to the said frame, the whole constructed as and for the purpose set forth.

GEO. W. PARRISH.

Witnesses:
JOHN A. FRANCIS,
J. H. PALMER,
W. T. YOUNGER.